United States Patent
Ghosh et al.

(10) Patent No.: US 7,796,593 B1
(45) Date of Patent: Sep. 14, 2010

(54) ROUTER USING INTERNAL FLOOD GROUPS FOR FLOODING VPLS TRAFFIC

(75) Inventors: Kaushik Ghosh, Sunnyvale, CA (US); Kireeti Kompella, Los Altos, CA (US); Raj Tuplur, San Jose, CA (US); Junan Chen, San Jose, CA (US); Amit Shukla, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 186 days.

(21) Appl. No.: 12/020,839

(22) Filed: Jan. 28, 2008

Related U.S. Application Data (60) Provisional application No. 61/016,283, filed on Dec. 21, 2007.

(51) Int. Cl.
*H04L 12/28* (2006.01)

(52) U.S. Cl. .................. 370/389; 370/390; 370/395.31; 370/395.53; 370/401

(58) Field of Classification Search .................. 370/351, 370/357, 360
See application file for complete search history.

(56) References Cited

U.S. PATENT DOCUMENTS

| | | | |
|---|---|---|---|
| 2004/0151120 A1* | 8/2004 | Shankar et al. | 370/249 |
| 2006/0291445 A1* | 12/2006 | Martini et al. | 370/351 |
| 2007/0091890 A1* | 4/2007 | Radhakrishnan et al. | 370/390 |

* cited by examiner

*Primary Examiner*—Pankaj Kumar
*Assistant Examiner*—Gautam Sharma
(74) *Attorney, Agent, or Firm*—Shumaker & Sieffert, P.A.

(57) ABSTRACT

In general, techniques are described for flooding VPLS traffic with a network device according to flood groups. The network device resides within a layer 3 (L3) network and includes a control unit that executes a virtual private LAN service (VPLS) protocol that enables a VPLS domain to operate over the L3 network. The network device further includes a plurality of packet forwarding engines, each of which include a plurality of interface cards that receive a layer 2 (L2) message originating from the L2 network. The packet forwarding engines associate the L2 packet with a configurable flood group, wherein the flood group defines criteria to determine which messages to associate to the flood group and indicates a set of the interface cards for forwarding the associated messages. The packet forwarding engines further flood the L2 packet via each interface card indicated by the associated flood group.

28 Claims, 4 Drawing Sheets

ROUTER USING INTERNAL FLOOD GROUPS FOR FLOODING VPLS TRAFFIC

This application claims the benefit of U.S. Provisional Application No. 61/016,283, filed Dec. 21, 2007, the entire content of which is incorporated herein by reference.

TECHNICAL FIELD

The invention relates to computer networks and, more particularly, to communicating data within computer networks.

BACKGROUND

Networks that primarily utilize data link layer devices are often referred to as layer 2 (L2) networks. A data link layer device is a device that operates within the second layer of the Open Systems Interconnection (OSI) reference model, i.e., the data link layer. One example of a data link layer device is a customer premise equipment (CPE) device, such as a switch, modem, Ethernet card, or wireless access point. Traditional L2 networks include Ethernet networks, asynchronous transfer mode (ATM) networks, frame relay networks, networks using high level data link control (HDLC), point-to-point (PPP) connections, PPP sessions from layer 2 tunneling protocol (L2TP) tunnels, and virtual local area networks (VLANs).

In some instances, a layer three (L3) network is used as an intermediate transport network between two or more separate L2 networks to enable communication between the separate L2 networks. Often these instances occur, for example, when a customer, such as a business, maintains two separate L2 networks at two different geographical locations. In this type of configuration, the L3 network transparently transports L2 communications between the L2 networks, thereby allowing the L2 networks to share an L2 service. The L2 network may be referred to as "customer" L2 networks because they typically purchase, as customers, the above described service provided by the L3 network. The L3 network may be referred to as the "service provider" network because the L3 network services the L2 networks by providing the underlying network upon which the L2 service operates.

One example of an L2 service is a Virtual Private LAN Service (VPLS). In general, VPLS allows two or more remote customer networks to be extended through the service provider (SP) network as if the SP network does not exist. In particular, L2 communications, such as Ethernet frames, are transported between customer networks via the SP network. In a typical configuration, VPLS-enabled routers that are associated with the SP network define label switched paths (LSPs) within the SP network to carry encapsulated L2 communications as if these customer networks were directly connected to the same LAN. To properly communicate via these LSPs, each of these VPLS-enabled routers store L2 information, such as media access control (MAC) addresses, as well as VPLS information, such as local and remote VPLS site information. In this manner, these VPLS-enabled routers provide transparent L2 connectivity across the SP network and transparently simulate a direct LAN.

Because a LAN typically requires the multicast of messages from one CPE device to all CPE devices on the same LAN, the VPLS-enabled routers, to simulate a direct LAN, broadcast traffic received from one customer network to each other customer network within the VPLS domain. This broadcast operation requires that the VPLS-enabled router replicate the traffic for each customer network and forward each instance of the traffic to each customer network, i.e., "flood" the network traffic throughout the simulated LAN or VPLS domain. However, a major concern arises with respect to flooding traffic, as flooded traffic, if not properly managed, may continue to loop the VPLS domain and consume substantial amounts of the SP network's resources.

To prevent these loops, the VPLS-enabled routers typically follow a simple flooding rule, sometimes referred to as "split horizon." Within the context of VPLS, the split horizon rule prohibits a VPLS-enabled router from forwarding traffic arriving on any interface back over the same interface on which the traffic arrived. This rule prevents the originating customer network from receiving its own traffic and attempting to again forward this traffic to the SP network (i.e., forming a traffic loop). If each other VPLS-enabled router adheres to this rule, the VPLS domain may prevent traffic from continually looping within the SP network and thereby prevent unnecessary consumption of resources used to process traffic within the SP network. Thus, the split horizon rule is often required to be implemented by all VPLS-enabled routers within a given VPLS domain to prevent loops.

SUMMARY

In general, techniques for flooding VPLS traffic according to flood groups are described. Flood groups offer more control over flooding of traffic within a VPLS domain when compared to the relatively simplistic split horizon rule. A flood group defines a group of interfaces through which traffic having specific characteristics is replicated and flooded out, contrary to the split horizon rule which mandates a single flooding rule. That is, a flood group may define policies that enable selective flooding of traffic based on, for example, specific characteristics of the traffic instead of the interface over which the traffic was received. Flood groups may also prohibit the router from flooding traffic to any configurable group of interfaces instead of only the interface over which the traffic was received. The generic and highly configurable nature of the flood groups described herein, therefore enable VPLS to expand and grow to accommodate evolving network technology, features, applications, and configurations.

For example, a network device, such as a router, that resides within a layer 3 (L3) network and executes a VPLS protocol that enables the VPLS domain over the L3 network may include a flood group. The flood group defines criteria used as a basis to associate L2 packets with the flood group and a set of interface cards that forward any L2 packet associated with the flood group. From this flood group, the network device may generate flood group policies in a syntax that packet forwarding engines included within the network device understand and update the packet forwarding engines with the flood group policies.

The packet forwarding engines, upon receiving a L2 packet via VPLS, associate the L2 packet with the flood group based on the flood group policies. That is, the packet forwarding engine accesses the flood group policies to determine whether the L2 packet meets the criteria embodied in the policies. If not, the L2 packet is not associated with the flood group. If so, the L2 packet is associated with the flood group by, for example, tagging, stamping, or otherwise indicating within the L2 packet or accompanying status information a flood group ID. The packet forwarding engines forward the L2 packet to each of the other packet forwarding engines, which parse the L2 packet to extract the flood group ID. Using the flood group ID as a key, the packet forwarding engines perform a lookup in the policies to determine the set of interface cards that forward the L2 packet. The packet forwarding engines flood the L2 packet via the determined set of forwarding interface cards.

In one embodiment, a method comprises executing a virtual private LAN service (VPLS) protocol within a network device residing within a layer 3 (L3) network to enable a VPLS domain to operate over a layer 3 (L3) network positioned intermediate to a plurality of layer 2 (L2) networks by encapsulating and forwarding L2 traffic through the intermediate L3 network so that, from the perspective of the L2 networks, the L2 networks appear to directly connect to each other. The method further comprises receiving an L2 packet originating from one of the L2 networks via one of a plurality of interface cards of the network device, and upon receiving the L2 packet with the network device, accessing a policy data structure stored within the network device that specifies one or more configurable VPLS flood groups, wherein the configurable flood group specifies packet criteria to map L2 packets to the VPLS flood groups, and wherein each of the flood groups indicates a set of the output interface cards of the network device to which to flood copies of the L2 packet. The method also comprises applying the criteria of the VPLS flood groups to the L2 packet to detect a match, upon detecting a match, associating the L2 packet with one of the VPLS flood groups having criteria that matched contents of the packet, and outputting copies of the L2 packet from each interface card of the network device specified by the flood group having the matching criteria.

In another embodiment, a network device that resides within a layer 3 (L3) network comprises a control unit that executes a virtual private LAN service (VPLS) protocol to enable a VPLS domain to operate over the L3 network positioned intermediate to a plurality of layer 2 (L2) networks by encapsulating and forwarding L2 traffic through the intermediate L3 network so that, from the perspective of the L2 networks, the L2 networks appear to directly connect to each other. The network device further comprises a plurality of interface cards that receive an L2 packet originating from one of the L2 networks, and upon receiving the L2 packet with the network device, access a policy data structure stored within the network device that specifies one or more configurable VPLS flood groups, wherein the configurable flood groups each specify packet criteria to map L2 packets to the VPLS flood groups, and wherein each of the flood groups indicates a set of the output interface cards of the network device to which to flood copies of the L2 packet. The network device also comprises a plurality of packet forwarding engines that apply the criteria of the VPLS flood groups to the L2 packet to detect a match, upon detecting a match, associate the L2 packet with one of the VPLS flood groups having criteria that matched contents of the packet, and outputs copies of the L2 packet from each interface card of the network device specified by the flood group having the matching criteria.

In another embodiment, a system comprises a plurality of layer 2 networks, a layer 3 (L3) network positioned intermediate to the plurality of L2 networks, and a network device that resides within the L3 network. The network device includes a control unit that executes a virtual private LAN service (VPLS) protocol to enable a VPLS domain to operate over the L3 network by encapsulating and forwarding L2 traffic through the intermediate L3 network so that, from the perspective of the L2 networks, the L2 networks appear to directly connect to each other. The network device further includes a plurality of interface cards that receive an L2 packet originating from one of the L2 networks, and upon receiving the L2 packet with the network device, access a policy data structure stored within the network device that specifies one or more configurable VPLS flood groups, wherein the configurable flood groups each specify packet criteria to map L2 packets to the VPLS flood groups, and wherein each of the flood groups indicates a set of the output interface cards of the network device to which to flood copies of the L2 packet. The network device also includes a plurality of packet forwarding engines that apply the criteria of the VPLS flood groups to the L2 packet to detect a match, upon detecting a match, associate the L2 packet with one of the VPLS flood groups having criteria that matched contents of the packet, and outputs copies of the L2 packet from each interface card of the network device specified by the flood group having the matching criteria.

In another embodiment, the invention is directed to A non-transitory computer-readable storage medium containing instructions. The instructions cause a programmable processor to execute a virtual private LAN service (VPLS) protocol within a network device residing within a layer 3 (L3) network to enable a VPLS domain to operate over a layer 3 (L3) network positioned intermediate to a plurality of layer 2 (L2) networks by encapsulating and forwarding L2 traffic through the intermediate L3 network so that, from the perspective of the L2 networks, the L2 networks appear to directly connect to each other. The instruction further cause the processor to receive an L2 packet originating from one of the L2 networks via one of a plurality of interface cards of the network device, and upon receiving the L2 packet with the network device, access a policy data structure stored within the network device that specifies one or more configurable VPLS flood groups, wherein the configurable flood group specifies packet criteria to map L2 packets to the VPLS flood groups, and wherein each of the flood groups indicates a set of the output interface cards of the network device to which to flood copies of the L2 packet. The instructions also cause the processor to apply the criteria of the VPLS flood groups to the L2 packet to detect a match, upon detecting a match, associate the L2 packet with one of the VPLS flood groups having criteria that matched contents of the packet, and output copies of the L2 packet from each interface card of the network device specified by the flood group having the matching criteria.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
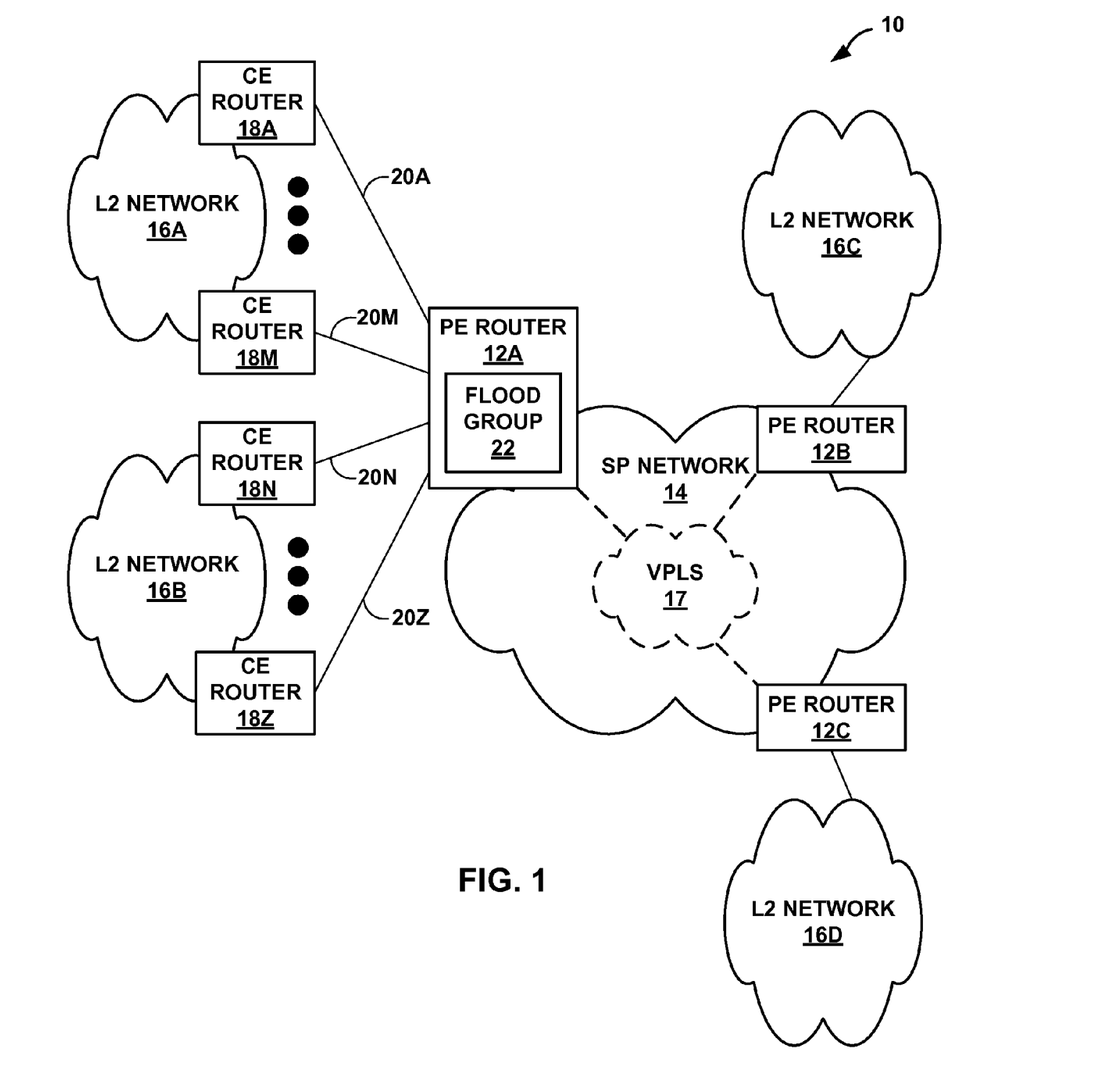
FIG. 1 is a block diagram illustrating an example network environment in which one or more of provider edge routers flood virtual private LAN service (VPLS) traffic according to flood group techniques described herein.

FIG. 1 is a block diagram illustrating an example network environment 10 in which one or more of provider edge routers 12A-12C flood virtual private LAN service (VPLS) traffic according to flood group techniques described herein. In the example of FIG. 1, provider edge (PE) routers 12A-12C ("PE routers 12") each resides within a service provider (SP) network 14. PE router 12A couples to external customer layer 2 (L2) networks 16A, 16B. PE router 12B couples to L2 network 16C, and PE router 12C couples to L2 network 16D. PE routers 12A-12C ("PE routers 12") provide VPLS 17 to transparently interconnect these L2 networks 16A-16D ("L2 networks 16"). That is, a VPLS domain 17 exists over SP network 14 that enables the transparent coupling of L2 networks 16. VPLS 17 is shown as a dashed lined cloud in FIG. 1 to indicate that it is a virtual or logical domain that exists within SP network 14, and PE routers 12 are shown as coupling to VPLS 17 via dashed lines to indicate that these are logical connections within SP network 14.

A coupling may be considered "transparent" if, from the perspective of L2 networks 16, each L2 network 16 appears to directly connect to other L2 networks 16. In other words, L2 networks 16 need not perform any special functions, such as encapsulation of L2 packets (e.g., frames or cells) within L3 packets, or even be aware of SP network 14 in order to communicate between each other, as PE routers 12, typically a layer 3 or L3 device, simulates a L2 device capable of coupling networks 16 together, such as a L2 switch or hub. Reference to layers 2 and 3 or L2 and L3 respectively should be considered references to respective layer 2, the data link layer, and layer 3, the network layer, of the Open Systems Interconnection reference model, commonly referred to as the "OSI model" for short.

SP network 14 typically comprises a L3, or packet switched, network wherein each device residing within the network is assigned an internet protocol (IP) address. Accordingly, PE routers 12 may each be assigned an IP address and transmit data in accordance with IP. PE routers 12 may establish transport (layer 4 of the OSI model) sessions over IP in accordance with the transmission control protocol (TCP) for transmitting data between devices residing within SP network 14. This form of transmission is commonly referred to as occurring in accordance with TCP/IP. SP network 14 may further comprise additional network devices, such as other internal routers, other PE routers, switches, hubs, servers, and network-ready devices including, for example, desktop computers, laptop computers, workstation, cellular phones, and personal digital assistants (PDAs). Although not shown explicitly within FIG. 1, it is assumed that PE routers 12 couple to one another via either direct links or a series of links and intervening routing devices.

L2 networks 16 comprise, as the name suggests, respective data link layer networks, such as Ethernet networks, asynchronous transfer mode (ATM) networks, frame relay networks, and networks using one or more of high level data link control (HDLC), point-to-point (PPP) connections, and PPP sessions from layer 2 tunneling protocol (L2TP) tunnels. L2 networks 16A, 16B comprise respective customer edge (CE) routers 18A-18M, 18N-18Z, each of which resides at the edge of one of customer L2 networks 16A, 16B. L2 networks 16C, 16D may also comprise similar CE routers and links but for ease of illustration these routers are not shown in FIG. 1. Typically, L2 networks 16 are owned by a single entity, such as a business or university, and each of L2 networks 16 reside in separate geographical locations. Because a single entity owns L2 networks 16, commonly the entity requires that these networks 16 be able to communicate between each other. As one example, the entity may require that CE routers 18A-18M, 18N-18Z be able to route traffic originating from devices within each of L2 networks 16A, 16B to CE routers 18N-18Z, 18A-18M of respective L2 networks 16B, 16A for delivery to devices within respective L2 networks 16B, 16A. These L2 devices may comprise one or more of a desktop computer, a laptop computer, a workstation, a cellular phone, a personal digital assistant (PDA), a server, a switch, a hub, or any other device capable of L2 communications.

To establish this inter-L2 network communication, the entity may directly couple these networks via a physical link, but this normally costs a prohibitive amount. As an alternative, SP network 14 may serve as an emulated direct connection by offering VPLS 17, which transparently provides a "virtual" direct connection between L2 networks 16. Accordingly, CE routers 18A-18Z each couple to PE router 12A via respective network links 20A-20Z, where PE routers 12 provide a virtual direct connection between L2 networks 16 via VPLS 17. PE routers 12, therefore, may each be described as supporting VPLS and, in order to support VPLS, execute a VPLS protocol.

In accordance with the VPLS protocol, PE routers 12 may define label switched paths (LSPs) within the SP network to carry encapsulated L2 communications as if these customer networks were directly connected to the same LAN. To properly communicate via these LSPs, each of these VPLS-enabled routers 12 store L2 information, such as media access control (MAC) addresses, as well as VPLS information, such as local and remote VPLS site information. In this manner, these VPLS-enabled routers 12 provide transparent L2 connectivity across the SP network and transparently simulate a direct LAN, thereby establishing VPLS 17.

Upon establishing VPLS 17 between L2 networks 16, L2 devices residing within L2 network 16A, for example, may communicate with L2 devices residing within L2 network 16B unaware that PE router 12A acts as an intermediary between L2 networks 16A, 16B. However, a conventional PE router, acting in accordance with the split horizon rule, receives an L2 communication, such as an Ethernet frame, from CE router 18A, for example, over one interface and forwards this over all other interfaces including interfaces that may transmit the Ethernet frame back to CE routers 18B-18M, thereby forming a traffic loop. PE router 12A, unlike the conventional PE router, includes flood group 22, which may be either configured automatically by a daemon and/or manually by an administrator (not shown in FIG. 1). Flood group 22 generally defines criteria to determine which messages to associate with flood group 22 and indicates a set of the interface cards for forwarding the associated messages. Although shown as a single flood group 22 in FIG. 1, PE router 12A may include multiple flood groups 22, and the invention should not be strictly limited to a single flood group 22.

Flood group 22 can be configured to enable a plurality of flooding schemes. For example, flood group 22 may be configured such that all traffic received over a first interface is forwarded only to a first set of other interfaces. That is, flood group 22 may define the criteria as any message received over a first interface and the forwarding interface cards as a set of the interface cards. As another example, flood group 22 may be configured such that all traffic having a specific characteristic, such as a defined destination port number, is forwarded only to a second set of interfaces. That is, flood group 22 may define the criteria as the specific message characteristic and the forwarding interface cards again as a set of the interface cards. As yet another example, flood group 22 may be configured such that all traffic arriving over a third set of interfaces is forwarded only to a fourth set of interfaces. That is, the criteria may be defined as a set of interface cards and the forwarding interface cards also as a set of interface cards. Thus, flood group 22 may dictate a wide variety of flooding schemes, some of which may be based on interface-specific criteria, such as in the first and third example, and some of which may be based on characteristic-specific criteria, such as in the second example, as well as, other flooding schemes that provide for flooding based on application-specific flooding semantic criteria and/or other criteria. Flood group 22 may also define a scheme that combines one or more of the above described flooding schemes, as well as, schemes based upon the below described auto-discovery feature of routing protocols, such as the Border Gateway Protocol (BGP).

It is assumed for purposes of illustration that flood group 22 indicates that all traffic received over interfaces or interface cards coupling to CE routers 18A-18M is forwarded only to interface cards that couple to CE routers 18N-18Z and not to PE routers 12B, 12C or more generally SP network 14. An entity may desire such flooding if, for example, L2 network 16A generates content that is only stored or published to L2 network 16B, and L2 network 16B acts as the main access point for such content for the rest of L2 networks 16. This flooding scheme may prevent L2 networks 16C, 16D from accessing unfinished content or content that has yet to be published (e.g., uploaded to L2 network 16B).

In the example of FIG. 1, PE router 12A receives a L2 packet or packet originating from L2 network 16A from one of CE routers 18A-18M via one of a plurality of interface cards included within PE router 12A but not shown in FIG. 1 for ease of illustration. PE router 12A, as described below in more detail, associates the L2 packet with flood group 22 because an interface card coupled to one of CE routers 18A-18M received the L2 packet. PE router 12A, for different flood groups, may associate the L2 packet with a flood group based upon particular characteristics included within the L2 packet, such as a particular destination port number. In some instances, it may associate the L2 packet with multiple flood groups, for example, two of the above described exemplary types. However, for ease of illustration, it is assumed that PE router 12A associates the incoming L2 packet with flood group 22 because flood group 22 requires that PE router 12A forward all messages received via interface cards coupled to CE routers 18A-18M to interface cards coupled to CE routers 18N-18Z.

PE router 12A may associate the L2 packet with flood group 22 by, for example, inserting a flood group identifier (ID) that indicates flood group 22 into the L2 packet or associated status information that accompanies the L2 packet through PE router 12A. Once associated, PE router 12A may forward the L2 packet to every other interface card, which based on the associated flood group ID, either forwards or drops the L2 packet. In the instance of a flood group ID indicating flood group 22, only those interfaces that couple to CE router 18N-18Z may forward the L2 packet and all other interfaces, such as those interfaces that couple to SP network 14, drop the L2 packet. Thus, PE router 12A by providing flood group 22 may enable a wide variety of flooding schemes, each of which can be tailored to suit particular requirements of a network, application, device, etc. Moreover, flood group 22 enables PE router 12A to conserve resources within SP network 14 by allowing SP network 14 to eliminate unnecessary multicasting, as in the above example where the L2 communication from L2 network 16A was not multicast to L2 networks 16C, 16D and only multicast to L2 network 16B.

Figure 2:
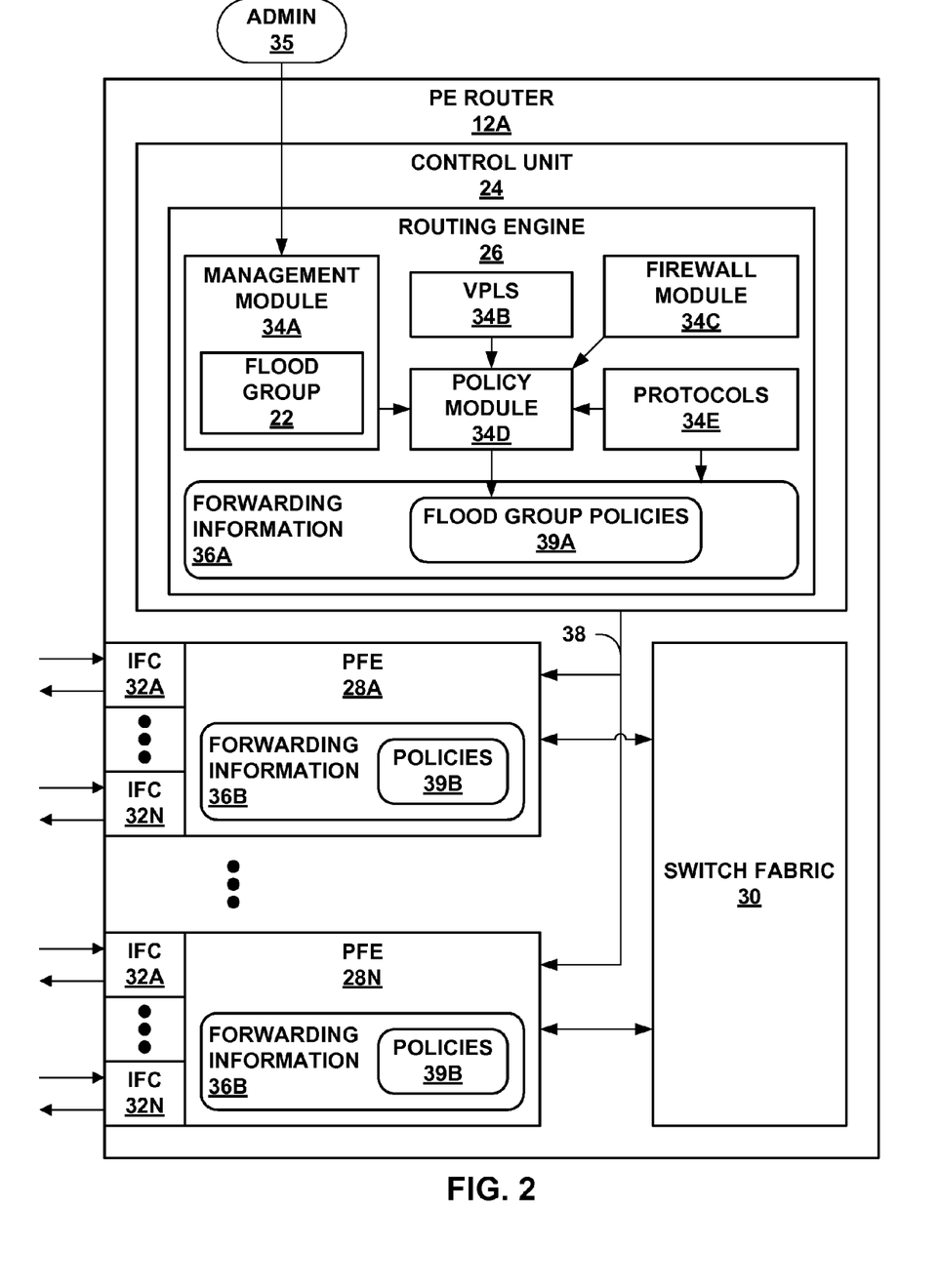
FIG. 2 is a block diagram illustrating PE router of FIG. 1 in further detail.

FIG. 2 is a block diagram illustrating PE router 12A of FIG. 1 in further detail. In the example of FIG. 2, PE router 12A includes a control unit 24 that executes a routing engine 26. PE router 12A also includes packet forwarding engines (PFEs) 28A-28N ("PFEs 28") and a switch fabric 30. PFEs 28 may each receive and send data packets via interface cards 32A-32N ("IFCs 32"). In other embodiments, each of PFEs 28 may comprise more or fewer IFCs 32 and even though FIG. 2 may suggest that each of PFEs 28 comprise the same number of IFCs 32, each PFE 28 may comprise a different number of IFCs 32. Switch fabric 30 forwards incoming data packets to the correct one of PFEs 28 for transmission over a network, such as SP network 14.

Generally, routing engine 26 maintains routing tables, executes routing protocols and controls user access to routing engine 26. Routing engine 26, as shown in FIG. 2, includes a plurality of modules, such as management module 34A, VPLS module 34B ("VPLS 34B"), firewall module 34C, policy module 34D, and protocols module 34E ("protocols 34E"). Management module 34A provides an interface by which an administrator, such as administrator 35 ("admin 35"), may interact with routine engine 26 to configure flood group 22. VPLS module 34B represents the VPLS protocol described above that routine engine 26 executes to support VPLS 17. Firewall module 34C represents firewall or more generally network security functionality that may monitor traffic flows traversing PE router 12A. Policy module 34D generates policies or rules based on input entered by modules 34A-34C, for example, that indicate specific operations PFEs 28 execute upon receiving messages or packets via IFCs 32. Protocols 34E represents various routing protocols and/or signaling protocols, such as a label distribution protocol (LDP) and a border gateway protocol (BGP), that routing engine 26 may execute to determine the current topology of SP network 14 and/or signal paths within the current topology respectively.

Routing engine 26 couples to each of PFEs 28 via a dedicated link 38. PFEs 28 are each responsible for forwarding packets received by their respective IFCs 32. Protocols 34E may, after determining the network topology, resolve the network topology into forwarding information 36A, which routing engine 26 via dedicated link 38 loads onto PFEs 28. Forwarding information 36A may specify "next hops" by indicating an address of the next routing device to which PFEs 28 forward a message received from a particular address.

The loading of forwarding information 36A is represented in FIG. 2 by forwarding information 36B included within each of PFEs 28. The loading may not necessarily proceed by completely replacing any prior forwarding information 36B with newly resolved forwarding information 36A, but instead may involve only updating forwarding information 36B within PFEs 28 to reflect any changes between previous and recently resolved forwarding information 36B, 38A respectively. Thus, forwarding information 36B may be either "loaded" or "updated" within PFEs 28, and each term may be used herein interchangeably.

In accordance with the flood group techniques described herein, admin 35 may interact with management module 34A to specify flood group 22. Admin 35 may, as described above, define criteria by which a message is associated with flood group 22 and a set of forwarding IFCs 32 of one or more of PFEs 28. Upon defining flood group 22, management module 34A interacts with policy module 34D, such that policy module 34D generates flood group policies 39A to include polices based on flood group 22. Alternatively or in conjunction with the manual configuration of flood group 22, VPLS 34B and firewall module 34C may each also interact with policy module 34D to specify additional policies within flood group policies 39A. These policies 39A can be described as being auto-configured, as admin 35 need not manually configure a flood group before these policies 39A are generated. Thus, in effect, a flood group was auto-configured by VPLS 34B and/or firewall module 34C. Protocols 34E, as described in reference to FIG. 4, may also auto-configure flood groups via interactions with policy module 34D. After auto-configuration, policy module 34D generates flood group policies 39A based on these auto-configured flood groups.

After generating flood group policies 39A, policy module 34D inserts flood group policies 39A into forwarding information 36A. As described above, routing engine 26 updates forwarding information 36B with the newly resolved forwarding information 36A, which includes flood group policies 39A. Policies 39A are, therefore, also updated within PFEs 28A and FIG. 2 reflects that policies 39A have been updated within PFEs 28A by including flood group policies 39B ("policies 39B") within forwarding information 36B. Flood group policies 39B provide, in a syntax that PFEs 28 may understand, the criteria and set of forwarding interface cards defined by, for example, flood group 22. For example, flood group policies 39B may define rules for associating messages to a flood group identifier (ID) and an index that associates the flood group ID to the set of forwarding interface cards Assuming for purposes of illustration that IFCs 32A-32M of PFE 28A couple to respective CE routers 18A-18M of FIG. 1 and that flood group 22 specifies the above assumed exemplary flooding scheme, PFE 28A, upon receiving an L2 packet from CE routers 18A via IFC 32A, may apply policies 39B to the L2 packet. Policies 39B cause PFE 28A in this instance to determine whether the L2 packet was received via one of IFCs 32A-32M of PFE 28A. PFE 28A may identify IFCs 32A-32M by a port number assigned to each of IFCs 32A-32M, and upon receipt of the L2 packet, may associate the media access control (MAC) address specified in the L2 packet with the port number of the receiving one of IFCs 32A-32M. Thus, policy 39B corresponding to flood group 22 may specify a port number that PFE 28A may use as criteria to determine if flood group 22 applies. Because the L2 packet was received via a port number specified by the criteria of policies 39B, PFE 28A associates flood group 22 with the L2 packet.

PFE 28A may associates flood group 22 with the L2 packet by tagging, stamping, or otherwise indicating within the L2 packet or accompanying status information a flood group ID associated with flood group 22. That is, policy module 34D, when generating policies 39A, may associate a unique flood group ID with each flood group used as a basis to generate policies 39A. The flood group ID is representative of the flood group and can be used to tag, stamp, or otherwise indicate that a message has been associated to a particular flood group. Upon applying policies 39B, PFE 28A tags the L2 packet with the flood group ID associated with flood group 22. PFE 28A may, if other policies 39B apply, tag the L2 packet with other flood group IDs associated with other flood groups. In this manner, PFEs 28 may associate an L2 packet with a plurality of flood groups.

After tagging the L2 packet according to flood group policies 39B, PFE 28A forwards the message via switch fabric 30 to PFEs 28B-28N. Each of PFEs 28B-28N receive the tagged L2 packet and access forwarding information 36B and policies 39B to determine whether to forward the L2 packet via their respective IFCs 32. For example, assuming IFCs 32A-32M of PFE 28N each couple to CE routers 18N-18Z and again that flood group 22 specifies the above assumed exemplary flooding scheme, PFE 28N, upon receiving the tagged L2 packet, performs a lookup within policies 39B using the flood group ID indicated within either the L2 packet or accompanying status information to determine whether to forward the L2 packet via any of its IFCs 32. Considering that flood group 22 specifies that all messages received via IFCs 32A-32M of PFE 28A are to be forwarded via IFCs 32A-32M of PFE 28N, the lookup by PFE 28N succeeds in returning a set of IFCs including IFCs 32A-32M of PFE 28N. Again, policies 39B may indicate the set of IFCs 32A-32M of PFE 28N by referencing each port number assigned to these IFCs 32. PFE 28N removes any tags, including the flood group IDs, associated with the L2 packet and forwards the L2 packet via IFCs 32A-32M of PFE 28N to CE routers 18N-18Z.

Notably, each of PFEs 28B-28M receive the tagged L2 packet via switch fabric 30 but upon performing the lookup in respective policies 39B, each of these PFEs 28B-28M determine that none of their respective IFCs 32 are designated within policies 39B as the forwarding set of IFCs by flood group 22 and therefore these PFEs 28B-28M drop the tagged L2 packet. Thus, as described above, PE router 12A may either manually and/or automatically configure a flood group 22 to facilitate finer control over forwarding within a VPLS domain, such as VPLS domain 17.

The flood group techniques are described above with respect to a number of modules and components, however, these modules and components are presented merely for purposes of illustration. The modules may be implemented as separate functionalities of a single hardware component or of a single software program. Moreover, the modules may be implemented as a combination of both hardware and software. For example, A non-transitory computer-readable storage medium may store instructions (e.g., software) that cause a programmable processor (e.g., hardware) to perform the flood group techniques described herein. The techniques, therefore, should not be strictly limited to the particular exemplary embodiments described herein and may include a number of other embodiments.

Figure 3:
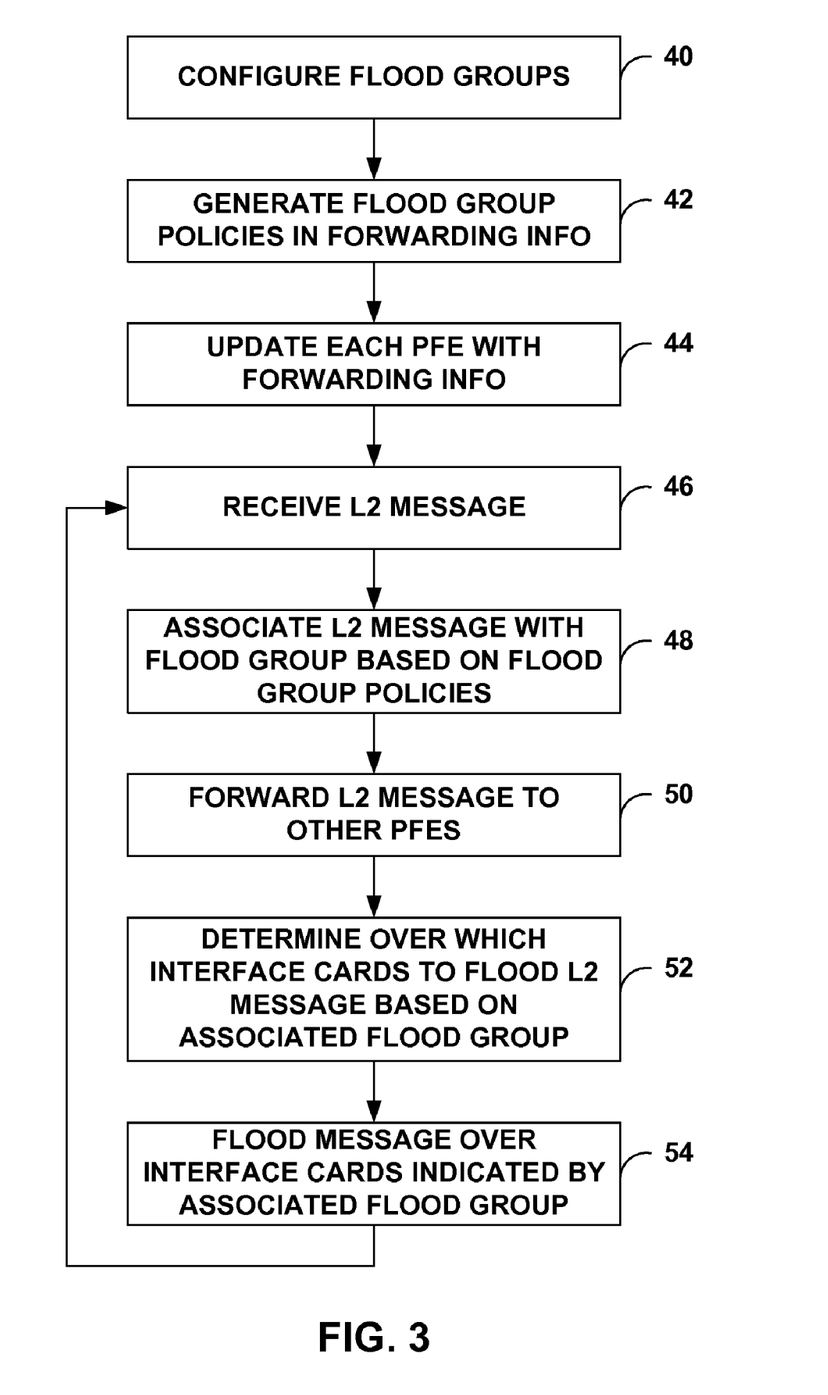
FIG. 3 is a flow chart illustrating exemplary operation of a network device in performing the flood group techniques described herein.

FIG. 3 is a flow chart illustrating exemplary operation of a network device, such as PE router 12A of FIG. 2, in performing the flood group techniques described herein. Although describe in reference to PE router 12A of FIG. 2, the flood group techniques may apply to any network device capable of receiving and forwarding L2 packets.

Initially, an administrator, such as admin 35, may manually via management module 34A and/or one of modules 34B, 34C, 34E may automatically via direct interaction with policy module 34D configure a flood group, such as flood group 22 (40). As described above, configuration of flood group 22 may enable various flooding schemes. Below follows two different configurations to implement two different flooding schemes. The following configurations may be entered manually by an administrator via management module 34A and/or provided by one of modules 34B, 34C, 34E.

The first configuration may comprise the following series of commands:

routing-instance foo {
   instance-type vpls; # this is a detail
   interface at –0/1/0.0;
   interface at –0/1/0.1;
   interface at –0/1/0.2;
   interface at –0/1/0.3;
   interface at –0/1/0.4;
   [ . . . ]
   flood-group grp_1 {
     interface at –0/1/0.0;
     interface at –0/1/0.1;
     flood-to all_VE, all_CE;
   }
   flood-group grp_2 {

```
        interface at –0/1/0.2;
        interface at –0/1/0.3;
        flood-to grp_1, all_VE;
    }
}
```

The above commands define two flood groups, grp_1 and grp_2. Flood group 1 or grp_1 specifies that packets or L2 packets entering at –0/1/0.0 (where 0/1/0.0 identifies a particular interface card) or at –0/1/0.1 are flooded to the relevant default groups (all_VE and all_CE) per the simple split-horizon rule. Flood group 2 or grp_2 specifies that packets or L2 packets entering at –0/1/0.2 or at –0/1/0.3 are flooded only to the core-facing, or SP network-facing, interfaces (e.g., those interface cards 32 that couple to SP network 14) at to those interfaces defined by grp_1, but not to the default all_CE flooding group, contrary to the split horizon rule.

The second configuration may be defined by the following second series of commands:

```
        family vpls {
            filter group-map {
                term check-ipv4 {
                    from {
                        ether-type ipv4;
                        vlan-ether-type ipv4;
                        source-mac-address {
                            00:11:22:33:44:55/48;
                        }
                        source-ip-address {
                            1.2.3.4/32;
                        }
                        destination-prefix-list {
                            dest-list; ## 'dest-list' to be defined
                        }
                        destination-port ftp;
                        protocol tcp;
                    }
                    forwarding-class assured-forwarding;
                }
                then {
                    flood-group-index <group-idx>;
                }
            }
        }
    }
}
fe-0/3/0 {
    unit 0 {
        family vpls {
            filter {
                input group-map;
            }
        }
    }
}
```

These commands provide for flooding of packets or L2 packets to specific output interface cards or interface card groups based on characteristics of the L2 packets or packets. These commands define a filter to inspect packets (See above "term check-ipv4") and map matching packets to an appropriate group index (See above "then {flood-group-index<group-idx>}"). The filter is applied to packets as they enter PE router 12A and if a match is found, the filter associates the packets with a particular flood group (See above "flood-group-index <group-idx>"). Upon receipt of the tagged packets, PFEs 28 access a "group-map" to determine the appropriate forwarding IFCs 32 corresponding to the assigned flood group ID.

Once configured, policy module 34D generates flood group policies 39A and inserts these policies 39A into forwarding information 36A, as described above (42). Also as described above, routing engine 26, upon generating policies 39A, updates each of PFEs 28 with forwarding information 36A and polices 39A, which FIG. 2 indicates by including forwarding information 36B and policies 39B in each of PFEs 28 (44).

PFEs 28 next receive L2 packets via respective IFCs 32, and as described above, associate the L2 packets with a flood group based on flood group policies 39B (46, 48). That is, PFEs 28 apply flood group policies 39B to determine whether to tag the L2 packets with one or more flood group IDs. If one of the L2 packets satisfies the criteria defined by one of policies 39B, the one of PFEs 28 that received the L2 packet tags the L2 packet with the corresponding flood group ID. After tagging the L2 packet, the one of PFEs 28 that received the L2 packet forwards the L2 packet to every other one of PFEs 28 via switch fabric 30 (50).

Those PFEs 28 that receive tagged L2 packets, access the tag to determine the one or more flood group IDs or associated flood groups. Using the flood group ID as a key, PFEs 28 perform a lookup within policies 39B to determine which of IFCs 32 forward or flood the L2 packet (52). If none of the flood groups associated with the L2 packet indicate IFCs 32 included within the one of PFEs 28 performing the lookup, these PFEs 28 drop the L2 packet, as described above. However, if the flood group associated with the L2 packet indicates one or more IFCs 28 included within the one of PFEs 28 performing the lookup, these PFEs 28 remove any tags and forward or flood the L2 packet over those IFCs 32 indicated by the associated flood group (54). After forwarding the L2 packet, PFEs 28 continue to receive L2 packet and perform the above described flood group techniques (46-54).

Figure 4:
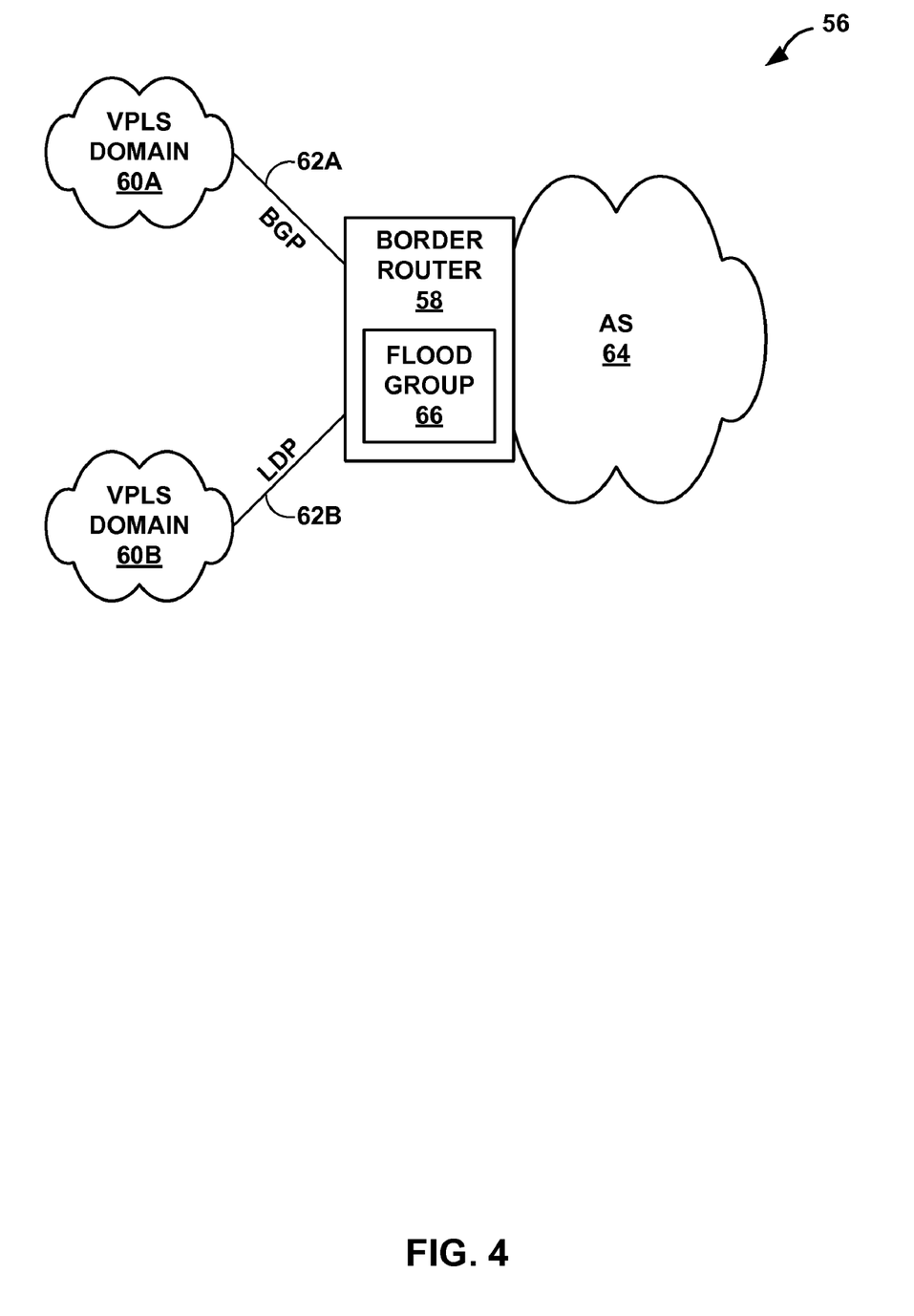
FIG. 4 is a diagram illustrating another example network environment in which a border router employs the flood group techniques described herein to conjoin two VPLS domains that are established via distinct protocols.

FIG. 4 is a diagram illustrating another example network environment 56 in which a border router 58 employs the flood group techniques described herein to conjoin two VPLS domains 60A, 60B that are established via distinct protocols. Each of VPLS domains 60A, 60B ("VPLS domains 60") may be similar to VPLS 17 shown in FIG. 1 in that each VPLS domain 60 comprises an SP network 14 over which a VPLS, such as VPLS 17, executes to transparently couple geographically separate L2 networks 16.

VPLS domain 60A comprises PE routers, such as PE routers 12, that each establishes VPLS domain 60A using a first type of protocol signaling, such as border gateway protocol (BGP) signaling. VPLS domain 60B also comprises PE routers, such as PE routers 12, that each establishes VPLS domain 60B using a second type of protocol signaling, such as label distribution protocol (LDP) signaling. Consequently, one or more of the PE routers (not shown in FIG. 4) of each of VPLS domains 60 communicate with border router 58 via their respective signaling protocols, BGP and LDP, which FIG. 4 illustrates as "BGP" and "LDP" labels near links 62A, 62B that couple each of VPLS domains 60 to border router 58.

As further shown in FIG. 4, network environment 56 includes an autonomous system 64 ("AS 64"), where border router 58 resides at the border or edge of AS 64. AS 64 may comprise a collection of interconnected IP, or packet-switched, networks. Border router 58 may be substantially similar to PE router 12A as illustrated in FIG. 2. Border router 58, as shown in FIG. 4, includes a flood group 66 that enables the conjoining of VPLS domains 60 despite the disparate signaling protocols each of VPLS domains 60 execute. Flood group 66, in this context, may sometimes be referred to as a "mesh group" and these two terms are interchangeable. The term "mesh group" arises because border router 58 may conjoin these two VPLS domains 60 together to effectively form a single meshed VPLS domain.

Because each of VPLS domains 60 are established using distinct signaling protocols, VPLS domains 60 are not aware of each other and therefore cannot directly establish a single VPLS domain that spans both of VPLS domains 60. Conventional border routers could not conjoin these two VPLS domains 60 because the conventional border router would flood traffic indiscriminately. That is, a conventional border router, upon receiving traffic from VPLS domain 60A for example, forwards the VPLS domain 60A traffic to VPLS domain 60B and AS 64. AS 64 need not receive this traffic and only VPLS domain 60B need receive this traffic, however, a conventional border router operating according to the split horizon rule could not enable this flood group scheme.

Border router 58, contrary to conventional border routers, includes flood group 66, which enables border router 58 to act as a bridge between disparate VPLS domains 60, thereby effectively establishing a single VPLS domain that spans both of VPLS domains 60. In other words, an administrator, such as admin 35, may configure flood group 66 such that L2 packets, traffic, communications, or messages received via VPLS domain 60A are forwarded only to VPLS domain 60B and not AS 64, similar to flood group 22 described above. Flood group 66 may specify criteria and a set of forwarding interface cards to enable this bridge flooding scheme. Border router 58 includes both the BGP and LDP routing protocols, and therefore is aware of both of VPLS domains 60. Thus, border router 58, because it is aware of each VPLS domain 60, may be configured with a flood group 66 such that L2 packets are forwarded between each VPLS domain 60, thereby effectively forming a single VPLS domain that spans both of VPLS domains 60.

More particularly, it is assumed, as before, that the PE routers of each VPLS domain 60 are fully meshed, and each of these "meshes" are referred to herein as "PE mesh groups." Border router 58 provides by way of flood group 66 the following forwarding rules. First, unicast packets or L2 packets incoming from VPLS domain 60A and destined for VPLS domain 60B are to be forwarded if the PE mesh groups of VPLS domains 60 belong to different PE mesh groups. Second, L2 packets received from the PE mesh group of VPLS domain 60A are to be flooded to VPLS domain 60B and AS 64 (assuming other VPLS domains exist as a part of AS 64, which are not shown in FIG. 4). Third, any L2 packet that is destined for AS 64 is checked for its mesh group information. If the mesh group corresponding to the egress port happens to be different from that of the ingress port, the packet is forwarded, otherwise the packet is dropped. Providing these rules in flood group 66 enables border router 58 to act as a bridge between disparate VPLS domains 60, and again, effectively form a single VPLS domain that spans both of VPLS domain 60.

Border router 58 may further auto-configure flood group 66 via BGP signaling. BGP provides auto-discovery functionality whereby PE routers, such as PE routers 12 of FIG. 1, automatically discover one another via BGP messages. Using this BGP auto-discovery, border router 58 may automatically discover BGP peers (e.g., PE routers 12) within BGP VPLS domain 60A and update flood group 66 as each successive BGP peer is discovered. Thus, protocols 34E, as shown in FIG. 2, may communicate with policy module 34D such that policy module 34D updates flood group policies 39A to include the newly discovered PE routers of VPLS domain 60A. Further detail regarding BGP auto-discovery with respect to VPLS can be found in Request for Comments (RFC) 4761, titled "Virtual Private LAN Server (VPLS) Using BGP for Auto-Discovery and Signaling," prepared by the Network Working Group of the Internet Engineering Task Force (IETF), dated January 2007, herein incorporated by reference. Border router 58 may also perform this same auto-configuration operation with LDP however typically LDP is statically or manually configured by an administrator.

Assuming flood group 66 provides for flooding traffic from VPLS domain 60A to VPLS domain 60B, border router 58 receives traffic from VPLS domain 60A and associates the traffic with flood group 66 by way of a flood group ID, as described above. Border router 58 forwards the traffic or L2 packets to each egress PFE, such as PFEs 28, which perform a lookup using the associated flood group ID within flood group policies, such as policies 39. Policies 39 identify IFC, such as IFCs 32, that forward the L2 packet, and those PFEs 28 that include the forwarding IFCs 32, forward the L2 packet via those IFCs 32 to VPLS domain 60B. Border router 58 may not only forward inter-VPLS domain traffic but also may forward intra-VPLS domain traffic, as described with respect to FIG. 1. In this manner, a border router 58 may act not only as a bridge between VPLS domains, such as VPLS domains 60, but also as member providing a VPLS domain, such as PE router 12A. Various embodiments of the invention have been described. These and other embodiments are within the scope of the following claims.

The invention claimed is:

1. A method comprising:

executing a virtual private LAN service (VPLS) protocol within a network device residing within a layer 3 (L3) network to enable a VPLS domain to operate over a layer 3 (L3) network positioned intermediate to a plurality of layer 2 (L2) networks by encapsulating and forwarding L2 traffic through the intermediate L3 network so that, from the perspective of the L2 networks, the L2 networks appear to directly connect to each other;

receiving an L2 packet originating from one of the L2 networks via one of a plurality of interface cards of the network device, wherein each of the plurality of interface cards couple to the L2 networks of the VPLS domain;

upon receiving the L2 packet with the network device, accessing a policy data structure stored within the network device that specifies one or more configurable VPLS flood groups, wherein each of the configurable VPLS flood groups specifies packet criteria to map L2 packets to the respective one of the VPLS flood groups, and wherein each of the VPLS flood groups indicates a subset comprising less than all of the remaining plurality of interface cards to which to flood copies of the L2 packet other than the interface card on which the L2 packet was received;

applying the criteria of the VPLS flood groups to the L2 packet to detect a match;

upon detecting a match, associating the L2 packet with one of the VPLS flood groups having criteria that matched the contents of the L2 packet; and outputting copies of the L2 packet from each of the subset of the plurality of interface cards specified by the one of the VPLS flood groups having the matching criteria so that a copy of the L2 packet is not output to the L2 network from which the L2 packet was received and the copies are output to less than all of the other L2 networks of the VPLS domain in accordance with the matching VPLS group.

2. The method of claim 1, further comprising:

receiving, via a management module of the network device, configuration information that defines the flood groups and specifies the packet criteria and the set of output interface cards of the network device for each of the flood groups;

generating with a policy module of the network device flood group policies based on the respective configuration information, wherein each of the flood group policies defines rules for associating messages to a flood group identifier (ID) and for associating the flood group ID to the set of output interface cards; and updating the policy data structure stored within the network device with the generated flood group policies.

3. The method of claim 2, wherein associating the L2 packet with one of the VPLS flood groups comprises, upon detecting the match, assigning the flood group identifier (ID) associated with the flood group having the matching criteria to the L2 packet by appending the flood group ID as a header to the L2 packet.

4. The method of claim 3, wherein outputting the copies of the L2 packet comprises:

receiving one of the copies of the L2 packet including a copy of the header having the flood group ID with each of the interface cards;

accessing the policy data structure within the network device using the flood group ID as a key to determine the set of output interface cards; and forwarding one of the copies of the L2 packet via each of the interface cards included within the set of output interface cards.

5. The method of claim 1, further comprising:

automatically configuring one of the flood groups with one or more of a protocol module, a virtual private LAN service (VPLS) module, and a firewall module of the network device, wherein the one or more modules automatically configure the flood group without requiring any direct input from a user;

generating with a policy module of the network device at least one flood group policy based on the automatically configured flood group, wherein the flood group policy defines rules for associating messages to a flood group identifier (ID) and for associating the flood group ID to the set of output interface cards; and updating the policy data structure stored within the network device with the generated flood group policy.

6. The method of claim 5, wherein automatically configuring one of the flood groups comprises automatically configuring the flood group with a protocol module that executes a border gateway protocol (BGP), the protocol module providing to the policy module configuration information based on auto-discovery of BGP peers such that the automatically configured flood group includes the newly discovered BGP peers.

7. The method of claim 1, wherein a first set of the plurality of L2 networks comprises a first virtual private LAN service (VPLS) domain that is established using border gateway protocol (BGP) signaling and a second set of the plurality of L2 networks comprises a second VPLS domain that is established using label distribution protocol (LDP) signaling, wherein receiving the L2 packet comprises receiving an L2 packet from the first VPLS domain via one of a plurality of interface cards of the network device, and wherein outputting copies of the L2 packet comprises outputting copies of the L2 packet from each interface card of the network device specified by the flood group having the matching criteria such that the L2 packet is transmitted to the second VPLS domain despite that each of the first and second VPLS domains is established using distinct BGP and LDP signaling, thereby effectively enabling the VPLS domain to operate over the layer 3 L3 network positioned intermediate to the first and second VPLS domains by encapsulating and forwarding L2 traffic through the intermediate L3 network so that, from the perspective of the VPLS domains, the VPLS domains appear to directly connect to each other.

8. A network device that resides within a layer 3 (L3) network, the device comprising:

a control unit that executes a virtual private LAN service (VPLS) protocol to enable a VPLS domain to operate over the L3 network positioned intermediate to a plurality of layer 2 (L2) networks by encapsulating and forwarding L2 traffic through the intermediate L3 network so that, from the perspective of the L2 networks, the L2 networks appear to directly connect to each other;

a plurality of interface cards that couple to the plurality of L2 networks of the VPLS domain, receive an L2 packet originating from one of the L2 networks, and upon receiving the L2 packet with the network device, access a policy data structure stored within the network device that specifies one or more configurable VPLS flood groups, wherein each of the configurable VPLS flood groups specifies packet criteria to map L2 packets to the VPLS flood groups, and wherein each of the VPLS flood groups indicates a set subset of the plurality of interface cards to which to flood copies of the L2 packet other than the interface card on which the L2 packet was received;

a plurality of packet forwarding engines that apply the criteria of the VPLS flood groups to contents of the L2 packet to detect a match, upon detecting a match, associate the L2 packet with one of the VPLS flood groups having criteria that matched the contents of the packet, and output copies of the L2 packet from each each of the subset of the plurality of interface cards specified by the one of the VPLS flood groups having the matching criteria.

9. The network device of claim 8, wherein the control unit includes a management module to receive configuration information that defines the flood groups and specifies the packet criteria and the set of output interface cards of the network device for each of the flood groups;

wherein the control unit also includes a policy module that generates flood group policies based on the configuration information, wherein each of the flood group policies defines rules for associating messages to a flood group identifier (ID) and for associating the flood group ID to the set of output interface cards; and wherein the control unit further updates the policy data structure with the generated flood group policies.

10. The network device of claim 9, wherein the packet forwarding engine associates the L2 packet with one of the VPLS flood groups by appending the flood group identifier (ID) associated with the flood group having the matching criteria as a header to the L2 packet.

11. The network device of claim 10, wherein the packet forwarding engine outputs the copies of the L2 packet by:

receiving one of the copies of the L2 packet including a copy of the header having the flood group ID with each of the interface cards;

accessing the policy data structure within the network device using the flood group ID as a key to determine the set of output interface cards; and forwarding one of the copies of the L2 packet via each of the interface cards included within the set of output interface cards.

12. The network device of claim 8,
wherein the control unit includes:
one or more of a protocol module, a virtual private LAN service (VPLS) module, and a firewall module that automatically configure one of the flood groups without requiring any direct input from a user; and
a policy module that generates at least one flood group policy based on the automatically configured flood group, wherein the flood group policy defines rules for associating messages to a flood group identifier (ID) and for associating the flood group ID to the set of output interface cards, and
wherein the control unit further updates the policy data structure stored within the network device with the generated flood group policy.

13. The network device of claim 12, wherein the protocol module executes a border gateway protocol (BGP), the protocol module providing to the policy module configuration information based on auto-discovery of BGP peers such that the automatically configured flood group includes the newly discovered BGP peers.

14. The network device of claim 8,
wherein a first set of the plurality of L2 networks comprises a first virtual private LAN service (VPLS) domain that is established using border gateway protocol (BGP) signaling and a second set of the plurality of L2 networks comprises a second VPLS domain that is established using label distribution protocol (LDP) signaling,
wherein the plurality of interface cards receive the L2 packet by receiving an L2 packet from the first VPLS domain via one of a plurality of interface cards of the network device, and
wherein the plurality of packet forwarding engines output copies of the L2 packet by outputting copies of the L2 packet from each interface card of the network device specified by the flood group having the matching criteria such that the L2 packet is transmitted to the second VPLS domain despite that each of the first and second VPLS domains is established using distinct BGP and LDP signaling, thereby effectively enabling the VPLS domain to operate over the L3 network positioned intermediate to the first and second VPLS domains by encapsulating and forwarding L2 traffic through the intermediate L3 network so that, from the perspective of the VPLS domains, the VPLS domains appear to directly connect to each other.

15. A system comprising:
a plurality of layer 2 networks;
a layer 3 (L3) network positioned intermediate to the plurality of L2 networks;
a network device that resides within the L3 network and includes:
a control unit that executes a virtual private LAN service (VPLS) protocol to enable a VPLS domain to operate over the L3 network by encapsulating and forwarding L2 traffic through the intermediate L3 network so that, from the perspective of the L2 networks, the L2 networks appear to directly connect to each other;
a plurality of interface cards that couple to the plurality of L2 networks of the VPLS domain, receive an L2 packet originating from one of the L2 networks, and upon receiving the L2 packet with the network device, access a policy data structure stored within the network device that specifies one or more configurable VPLS flood groups, wherein each of the configurable VPLS flood groups specifies packet criteria to map L2 packets to the VPLS flood groups, and wherein each of the VPLS flood groups indicates a subset of the plurality of interface cards to which to flood copies of the L2 packet other than the interface card on which the L2 packet was received;
a plurality of packet forwarding engines that apply the criteria of the VPLS flood groups to contents of the L2 packet to detect a match, upon detecting a match, associate the L2 packet with one of the VPLS flood groups having criteria that matched the contents of the packet, and output copies of the L2 packet from each of the subset of the plurality of interface cards specified by the one of the VPLS flood groups having the matching criteria.

16. The system of claim 15,
wherein the control unit includes a management module to receive configuration information that defines the flood groups and specifies the packet criteria and the set of output interface cards of the network device for each of the flood groups;
wherein the control unit also includes a policy module that generates flood group policies based on the configuration information, wherein each of the flood group policies defines rules for associating messages to a flood group identifier (ID) and for associating the flood group ID to the set of output interface cards; and
wherein the control unit further updates the policy data structure with the generated flood group policies.

17. The system of claim 16, wherein the packet forwarding engine associates the L2 packet with one of the VPLS flood groups by appending the flood group identifier (ID) associated with the flood group having the matching criteria as a header to the L2 packet.

18. The system of claim 17, wherein the packet forwarding engine outputs the copies of the L2 packet by:
receiving one of the copies of the L2 packet including a copy of the header having the flood group ID with each of the interface cards;
accessing the policy data structure within the network device using the flood group ID as a key to determine the set of output interface cards; and
forwarding one of the copies of the L2 packet via each of the interface cards included within the set of output interface cards.

19. The system of claim 15,
wherein the control unit includes:
one or more of a protocol module, a virtual private LAN service (VPLS) module, and a firewall module that automatically configures one of the flood groups without requiring any direct input from a user; and
a policy module that generates at least one flood group policy based on the automatically configured flood group, wherein the flood group policy defines rules for associating messages to a flood group identifier (ID) and for associating the flood group ID to the set of output interface cards,
wherein the control unit further updates the policy data structure stored within the network device with the generated flood group policy.

20. The system of claim 19, wherein the protocol module executes a border gateway protocol (BGP), the protocol module providing to the policy module configuration information based on auto-discovery of BGP peers such that the automatically configured flood group includes the newly discovered BGP peers.

21. The system of claim 15,
wherein a first set of the plurality of L2 networks comprises a first virtual private LAN service (VPLS) domain that is established using border gateway protocol (BGP) signaling and a second set of the plurality of L2 networks comprises a second VPLS domain that is established using label distribution protocol (LDP) signaling, wherein the plurality of interface cards receive the L2 packet by receiving an L2 packet from the first VPLS domain via one of a plurality of interface cards of the network device, and wherein the plurality of packet forwarding engines output copies of the L2 packet by outputting copies of the L2 packet from each interface card of the network device specified by the flood group having the matching criteria such that the L2 packet is transmitted to the second VPLS domain despite that each of the first and second VPLS domains is established using distinct BGP and LDP signaling, thereby effectively enabling the VPLS domain to operate over the L3 network positioned intermediate to the first and second VPLS domains by encapsulating and forwarding L2 traffic through the intermediate L3 network so that, from the perspective of the VPLS domains, the VPLS domains appear to directly connect to each other.

22. A non-transitory computer-readable storage medium comprising instructions for causing a programmable processor to:

execute a virtual private LAN service (VPLS) protocol within a network device residing within a layer 3 (L3) network to enable a VPLS domain to operate over a layer 3 (L3) network positioned intermediate to a plurality of layer 2 (L2) networks by encapsulating and forwarding L2 traffic through the intermediate L3 network so that, from the perspective of the L2 networks, the L2 networks appear to directly connect to each other;

receive an L2 packet originating from one of the L2 networks via one of a plurality of interface cards of the network device, wherein each of the plurality of interface cards couple to the L2 networks of the VPLS domain;

upon receiving the L2 packet with the network device, access a policy data structure stored within the network device that specifies one or more configurable VPLS flood groups, wherein each of the configurable VPLS flood groups specifies packet criteria to map L2 packets to the respective one of the VPLS flood groups, and wherein each of the VPLS flood groups indicates a subset of the plurality of interface cards to which to flood copies of the L2 packet other than the interface card on which the L2 packet was received;

apply the criteria of the VPLS flood groups to the L2 packet to detect a match;

upon detecting a match, associate the L2 packet with one of the VPLS flood groups having criteria that matched the contents of the L2 packet; and output copies of the L2 packet from each of the subset of the plurality of interface cards specified by the one of the VPLS flood groups having the matching criteria.

23. A non-transitory computer-readable storage medium of claim 22, wherein the instructions cause the processor to further:

receive configuration information that defines the flood groups and specifies the packet criteria and the set of output interface cards of the network device for each of the flood groups;

generate flood group policies based on the respective configuration information, wherein each of the flood group policies defines rules for associating messages to a flood group identifier (ID) and for associating the flood group ID to the set of output interface cards; and update the policy data structure stored within the network device with the generated flood group policies.

24. A non-transitory computer-readable storage medium of claim 23, wherein the instructions cause the processor to associate the L2 packet with one of the VPLS flood groups by, upon detecting the match, assigning the flood group identifier (ID) associated with the flood group having the matching criteria to the L2 packet by appending the flood group ID as a header to the L2 packet, and wherein the instructions cause the processor to output the copies of the L2 packet by receiving one of the copies of the L2 packet including a copy of the header having the flood group ID with each of the interface cards, accessing the policy data structure within the network device using the flood group ID as a key to determine the set of output interface cards, and forwarding one of the copies of the L2 packet via each of the interface cards included within the set of output interface cards.

25. A non-transitory computer-readable storage medium of claim 22, wherein the instructions cause the processor to:

automatically configure one of the flood groups with a module of the network device, wherein the module automatically configures the flood group without requiring any direct input from a user;

generate with a policy module of the network device at least one flood group policy based on the automatically configured flood group, wherein the flood group policy defines rules for associating messages to a flood group identifier (ID) and for associating the flood group ID to the set of output interface cards; and update the policy data structure stored within the network device with the generated flood group policy.

26. The method of claim 1, further comprising:

receiving another L2 packet originating from the one of the L2 networks via the one of the plurality of interface cards of the network device;

applying the criteria of the VPLS flood groups to the contents of the other L2 packet to detect a match;

upon detecting a match, associating the L2 packet with a different one of the VPLS flood groups having criteria that matched the contents of the other L2 packet; and outputting copies of the L2 packet from each of the subset of the plurality of interface cards specified by the different one of the VPLS flood groups having the matching criteria, wherein the subset of the plurality of interface cards specified by the different one of the VPLS flood groups is different from the subset of the plurality of interface cards specified by the one of the VPLS flood groups.

27. The network device of claim 8, wherein the plurality of interface cards receive another L2 packet originating from the one of the L2 networks;

wherein the plurality of packet forwarding engines apply the criteria of the VPLS flood groups to the contents of the other L2 packet to detect a match, upon detecting a match, associate the L2 packet with a different one of the VPLS flood groups having criteria that matched the contents of the other L2 packet, and outputs copies of the L2 packet from each of the subset of the plurality of interface cards specified by the different one of the VPLS flood groups having the matching criteria, wherein the subset of the plurality of interface cards specified by the different one of the VPLS flood groups is different from the subset of the plurality of interface cards specified by the one of the VPLS flood groups.

28. The method of claim 1, wherein applying the criteria of the VPLS flood groups to the L2 packet to detect a match comprises applying the criteria of the VPLS flood groups to data of a transmission control protocol (TCP) header encapsulated by the L2 packet.

* * * * *